US012620719B2

(12) United States Patent
Li et al.

(10) Patent No.: US 12,620,719 B2
(45) Date of Patent: May 5, 2026

(54) PLANAR TRANSPARENT ANTENNA STRUCTURE

(71) Applicant: INDUSTRIAL TECHNOLOGY RESEARCH INSTITUTE, Hsinchu (TW)

(72) Inventors: Bing-Syun Li, Hsinchu City (TW); Li-Yang Tsai, Luodong Township (TW); Kuang-Hui Shih, Tainan City (TW); Ruo-Lan Chang, New Taipei City (TW); Kung-Ching Chu, Taipei City (TW); Wei-Chung Chen, Zhunan Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 83 days.

(21) Appl. No.: 18/625,964

(22) Filed: Apr. 3, 2024

(65) Prior Publication Data

US 2024/0339758 A1 Oct. 10, 2024

Related U.S. Application Data

(60) Provisional application No. 63/457,428, filed on Apr. 6, 2023.

(30) Foreign Application Priority Data

Jan. 24, 2024 (TW) ................................ 113102792

(51) Int. Cl.
*H01Q 9/28* (2006.01)
*H01Q 1/38* (2006.01)

(52) U.S. Cl.
CPC ............... *H01Q 9/285* (2013.01); *H01Q 1/38* (2013.01)

(58) Field of Classification Search
CPC ................................ H01Q 9/285; H01Q 1/38
See application file for complete search history.

(56) References Cited

U.S. PATENT DOCUMENTS 4,609,923 A * 9/1986 Boan .................... H01Q 15/161 343/912
7,847,753 B2 * 12/2010 Ishibashi .................. H01Q 9/30 343/702
(Continued)

FOREIGN PATENT DOCUMENTS

CN 111864341 A 10/2020
CN 112911049 A 6/2021
(Continued)

OTHER PUBLICATIONS

Taiwanese Office Action and Search Report for Taiwanese Application No. 113102792, dated Mar. 6, 2025.

*Primary Examiner* — Seung H Lee
(74) *Attorney, Agent, or Firm* — Birch, Stewart, Kolasch & Birch, LLP

(57) ABSTRACT

A planar transparent antenna structure is provided. The planar transparent antenna structure includes a dielectric substrate, a radiation conductive layer and a ground conductive layer. The dielectric substrate has a first surface and a second surface. The radiation conductive layer is disposed on the first surface of the dielectric substrate. The ground conductive layer is disposed on the second surface of the dielectric substrate. The radiation conductive layer and the ground conductive layer are composed of a plurality of wires connected in a mesh manner. Each of the wires is composed of a plurality of grid lines connected in a mesh manner.

20 Claims, 11 Drawing Sheets

(56) References Cited

U.S. PATENT DOCUMENTS

| | | | | |
|---|---|---|---|---|
| 8,786,516 | B2 * | 7/2014 | Parsche | H01Q 1/38<br>343/897 |
| 2020/0203830 | A1 | 6/2020 | Tsuchiya et al. | |
| 2024/0128639 | A1 * | 4/2024 | Kim | H01Q 1/38 |

FOREIGN PATENT DOCUMENTS

| | | | | | |
|---|---|---|---|---|---|
| CN | 114039216 | A | | 2/2022 | |
| CN | 114101978 | A | | 3/2022 | |
| EP | 2 526 589 | B1 | | 11/2014 | |
| FR | 2955430 | A1 | * | 7/2011 | H01Q 9/0407 |
| JP | 2017-175540 | A | | 9/2017 | |
| KR | 10-1060424 | B1 | | 8/2011 | |
| KR | 20210081027 | A | * | 7/2021 | H01Q 1/243 |
| TW | 202215709 | A | | 4/2022 | |
| TW | 202245330 | A | | 11/2022 | |
| WO | WO 2020/071316 | A1 | | 4/2020 | |

* cited by examiner

PLANAR TRANSPARENT ANTENNA STRUCTURE

This application claims the benefit of U.S. Provisional application Ser. No. 63/457,428, filed Apr. 6, 2023, and Taiwan application Serial No. 113102792, filed Jan. 24, 2024, the disclosure of which are incorporated by reference herein in its entirety.

TECHNICAL FIELD

The disclosure relates to a planar transparent antenna structure.

BACKGROUND

Traditional antennas do not have light penetration, so when used in related fields such as glass windows, vehicle sunroofs and vehicle side windows, they will encounter problems of blocking the field of view and being in conflict with the environment.

Traditionally, metal oxide semiconductor is used to make antennas to achieve transparency. However, metal oxides have poor electrical conductivity, which is 100 times worse than metal. This in turn causes the antenna radiation efficiency to be significantly attenuated, seriously affecting the electrical properties of the antenna.

The industry needs to develop an antenna with a light transmittance greater than 80% and good radiation function to expand the antenna to some applications such as vehicles, buildings, displays, etc.

SUMMARY

The disclosure is directed to a planar transparent antenna structure. Through the design of the two-levels metal mesh, the planar transparent antenna structure could not only show a certain degree of light transmittance, but also have good radiation efficiency.

According to one embodiment, a planar transparent antenna structure is provided. The planar transparent antenna structure includes a dielectric substrate, a radiation conductive layer and a ground conductive layer. The dielectric substrate has a first surface and a second surface. The radiation conductive layer is disposed on the first surface of the dielectric substrate. The ground conductive layer is disposed on the second surface of the dielectric substrate. The radiation conductive layer and the ground conductive layer are composed of a plurality of wires interlaced and connected with each other, and each of the wires is composed of a plurality of grid lines interlaced and connected with each other.

According to another embodiment, a planar transparent antenna structure is provided. The planar transparent antenna structure includes a dielectric substrate, a radiation conductive layer and a ground conductive layer. The dielectric substrate has a first surface and a second surface. The radiation conductive layer is disposed on the first surface of the dielectric substrate. The ground conductive layer is disposed on the second surface of the dielectric substrate. The radiation conductive layer and the ground conductive layer are composed of a plurality of wires interlaced and connected with each other, and each of the wires has a plurality of holes.

According to an alternative embodiment, a planar transparent antenna structure is provided. The planar transparent antenna structure includes a dielectric substrate, a radiation conductive layer and a ground conductive layer. The dielectric substrate has a first surface and a second surface. The radiation conductive layer is disposed on the first surface of the dielectric substrate. The ground conductive layer is disposed on the second surface of the dielectric substrate. The radiation conductive layer and the ground conductive layer have a plurality of openings and a plurality of grid lines, and the grid lines are distributed between the openings.

Figure 1:
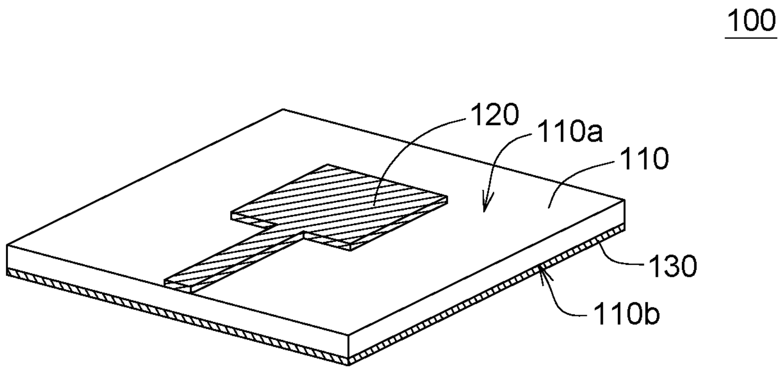
FIG. 1 illustrates a three-dimensional view of the planar transparent antenna structure according to an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 2:
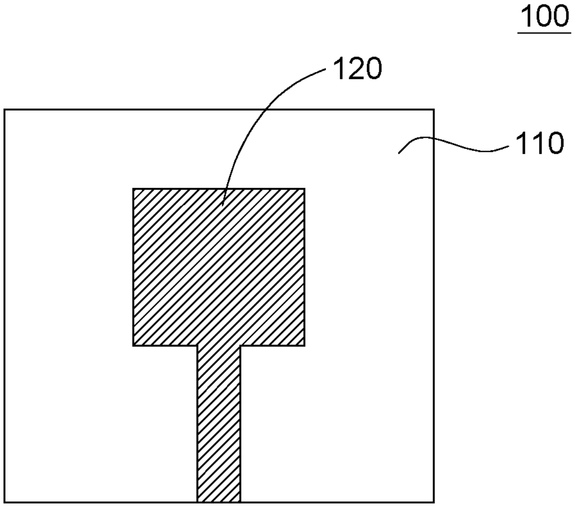
FIG. 2 illustrates a top view of the planar transparent antenna structure of the FIG. 1.
Figure 3:
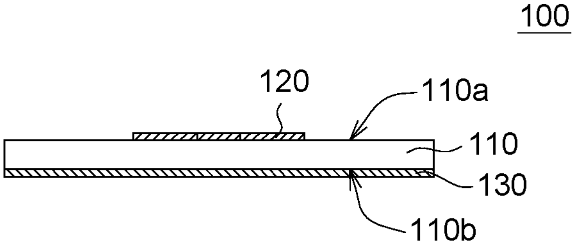
FIG. 3 illustrates a side view of the planar transparent antenna structure of the FIG. 1.

Please refer to FIGS. 1 to 3. FIG. 1 illustrates a three-dimensional view of the planar transparent antenna structure 100 according to an embodiment. FIG. 2 illustrates a top view of the planar transparent antenna structure 100 of the FIG. 1. FIG. 3 illustrates a side view of the planar transparent antenna structure 100 of the FIG. 1.

The planar transparent antenna structure 100 includes a dielectric substrate 110, a radiation conductive layer 120 and a ground conductive layer 130. The material of the dielectric substrate 110 is, for example, acrylic, plastic, glass and other transparent materials. The dielectric substrate 110 has a first surface 110*a* and a second surface 110*b*. The radiation conductive layer 120 is disposed on the first surface 110*a* of the dielectric substrate 110. The ground conductive layer 130 is disposed on the second surface 110*b* of the dielectric substrate 110. The material of the radiation conductive layer 120 and the ground conductive layer 130 is, for example, metal.

Figure 4:
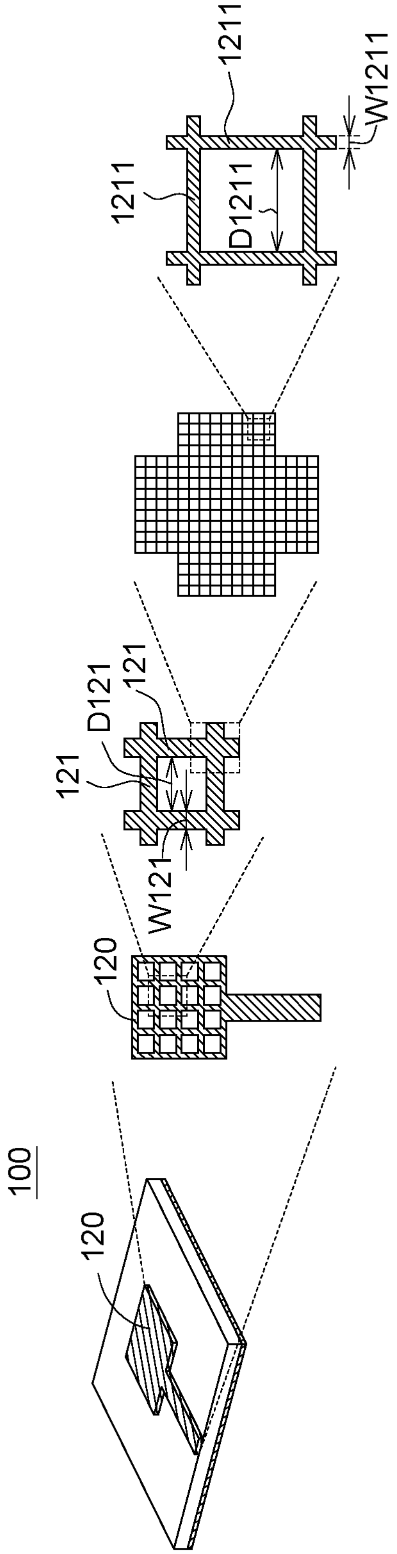
FIG. 4 illustrates the radiation conductive layer of the planar transparent antenna structure according to one embodiment.
Figure 5:
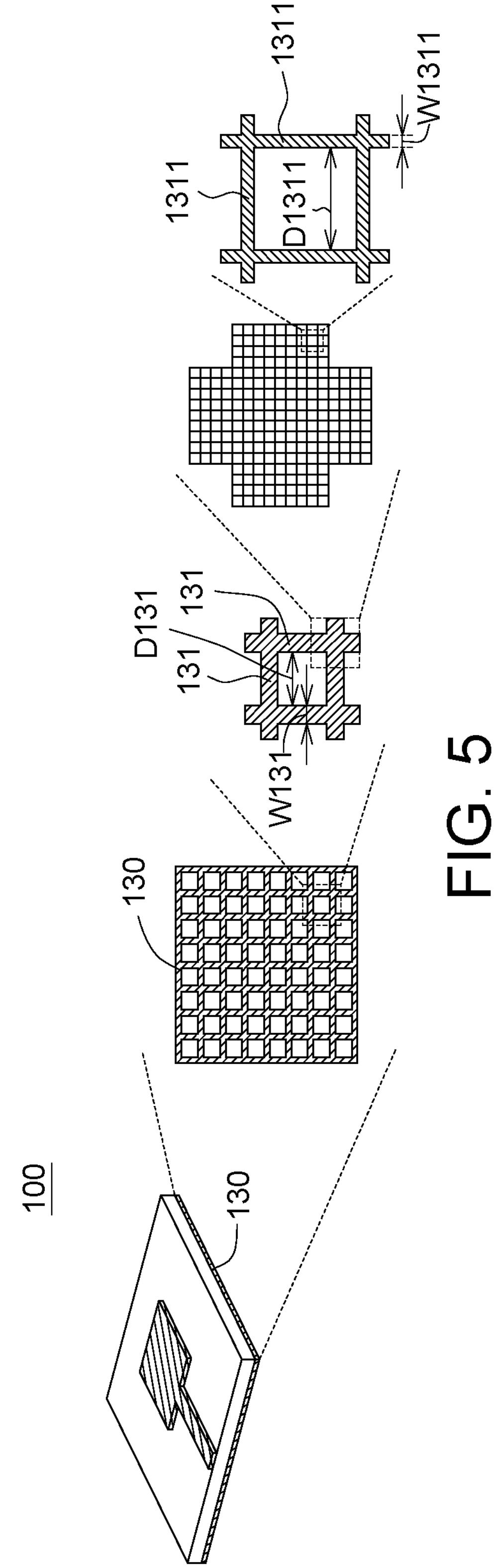
FIG. 5 illustrates the ground conductive layer of the planar transparent antenna structure according to one embodiment.

Please refer to FIGS. 4 and 5. FIG. 4 illustrates the radiation conductive layer 120 of the planar transparent antenna structure 100 according to one embodiment. FIG. 5 illustrates the ground conductive layer 130 of the planar transparent antenna structure 100 according to one embodiment. As shown in FIG. 4, the radiation conductive layer 120 is composed of a plurality of wires 121 interleaved and connected with each other (for instance, in a mesh manner). Each of the wires 121 is composed of a plurality of grid lines 1211 interleaved and connected with each other.

The wires 121 are substantially parallel or perpendicular to each other to form a thicker mesh. The grid lines 1211 are substantially parallel or perpendicular to each other to form a thinner mesh. The grid lines 1211 are substantially parallel or perpendicular to the wires 121. Through the design of the mech structure, the planar transparent antenna structure 100 could have a certain degree of light transmittance.

The radiation conductive layer 120 is not a solid structure, and the wire 121 is not a solid structure either. Only the grid line 1211 is a solid structure.

In one embodiment, the widths W121 of the wires 121 could be substantially identical. The width W121 of each of the wires 121 is, for example, smaller than the spacing D121 among the wires 121 to increase the light transmittance.

In one embodiment, the spacing D121 among the wires 121 is less than 1/10, 1/15, 1/20, 1/25 of the dielectric wavelength of the dielectric substrate 110. In one embodiment, the spacing D121 among the wires 121 could be substantially identical.

The width W1211 of each of the grid lines 1211 is 5 to 100 um, such as 5 um, 20 um, 40 um, 60 μm, 80 um, or 100 μm. In one embodiment, the widths W1211 of the grid lines 1211 could be substantially identical. For example, the width W1211 of each of the grid lines 1211 is smaller than the spacing D1211 among the grid lines 1211, to increase the light transmittance.

The spacing D1211 among the grid lines 1211 is 100 to 300 um, such as 100 um, 150 um, 200 um, 250 um or 300 μm. In one embodiment, the spacing D1211 among the grid lines 1211 could be substantially identical.

The width W121 of each of the wires 121 is greater than the sum of the widths W1211 of the grid lines 1211 and the spacings D1211 among the grid lines 1211, so that each of the wires 121 could be composed of multiple grid lines 1211.

As shown in FIG. 5, the ground conductive layer 130 is composed of several wires 131 interleaved and connected with each other. Each of the wires 131 is composed of several grid lines 1311 interleaved and connected with each other.

The wires 131 are substantially parallel or perpendicular to each other to form a thicker mesh. The grid lines 1311 are substantially parallel or perpendicular to each other to form a thinner mesh. The grid lines 1311 are substantially parallel or perpendicular to the wires 131. The ground conductive layer 130 is not a solid structure, and the wire 131 is not a solid structure. Only the grid line 1311 is a solid structure.

In one embodiment, the widths W131 of the wires 131 could be substantially the same. The width W131 of each of the wires 131 is, for example, smaller than the spacing D131 among the wires 131 to increase the light transmittance.

In one embodiment, the spacing D131 among the wires 131 is less than 1/10, 1/15, 1/20, 1/25 of the dielectric wavelength of the dielectric substrate 110. In one embodiment, the spacings D131 among the wires 131 could be substantially identical.

The width W1311 of each of the grid lines 1311 is 5 to 100 um, such as 5 um, 20 um, 40 um, 60 μm, 80 um, or 100 μm. In one embodiment, the widths W1311 of the grid lines 1311 could be substantially identical. For example, the width W1311 of each of the grid lines 1311 is smaller than the spacing D1311 among the grid lines 1311 to increase the light transmittance.

The spacing D1311 among the grid lines 1311 is 100 to 300 um, such as 100 um, 150 um, 200 um, 250 um or 300 μm. In one embodiment, the spacing D1311 among the grid lines 1311 could be substantially identical.

The width W131 of each of the wires 131 is greater than the sum of the widths W1311 of the grid lines 1311 and the spacings D1311 of the grid lines 1311, so that each of the wires 131 could be composed of multiple grid lines 1311.

The wires 131 of the ground conductive layer 130 may be substantially parallel or perpendicular to the wires 121 of the radiation conductive layer 120. The grid lines 1311 of the ground conductive layer 130 may be substantially parallel or perpendicular to the grid lines 1211 of the radiation conductive layer 120.

The wires 131 of the ground conductive layer 130 could overlap the wires 121 of the radiation conductive layer 120, and the grid lines 1311 of the ground conductive layer 130 could overlap the grid lines 1211 of the radiation conductive layer 120 to increase the light transmittance.

Figure 6:
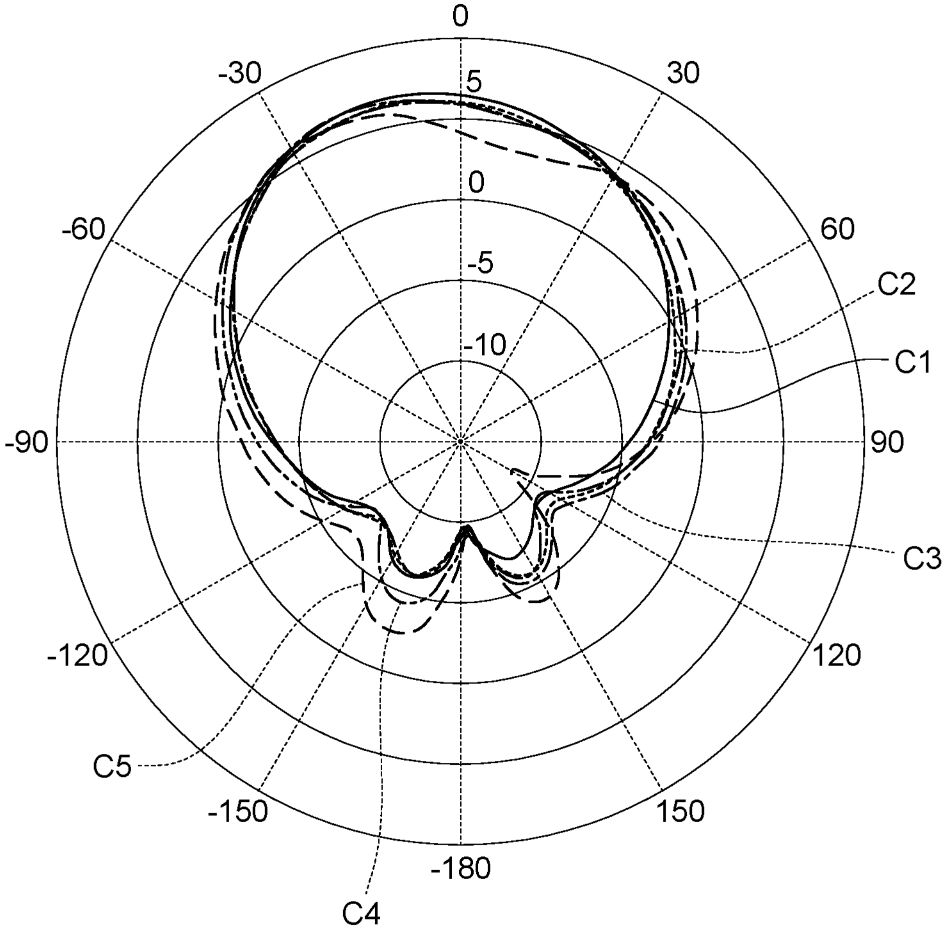
FIG. 6 shows a radiation field diagram of the planar transparent antenna structure with different spacings.

Please refer to FIG. 6, which shows a radiation field diagram of the planar transparent antenna structure 100 with different spacings D121 and different spacings D131. When the radiation conductive layer and the ground conductive layer are solid structures (without any mesh structure), this planar transparent antenna structure has a radiation field C1. When each of the spacing D121 and the spacing D131 is 1/25 of the dielectric wavelength, the planar transparent antenna structure 100 has a radiation field C2. When each of the spacing D121 and the spacing D131 is 1/20 of the dielectric wavelength, the planar transparent antenna structure 100 has a radiation field C3. When each of the spacing D121 and the spacing D131 is 1/15 of the dielectric wavelength, the planar transparent antenna structure 100 has a radiation field C4. When each of the spacing D121 and the spacing D131 is 1/10 of the dielectric wavelength, the planar transparent antenna structure 100 has a radiation field C5. As shown in the FIG. 6, comparing to the radiation field C1, the radiation field C5 has a significant expansion of the Back Lobe at −180 degrees, and a significant shrinkage of the Main Lobe. Comparing to the radiation field C1, the Back Lobe of the radiation fields C2 and C3 at −180 degrees does not increase significantly, and the Main Lobe of the radiation fields C2 and C3 does not shrink significantly. Therefore, in application scenarios that require the radiation efficiency of transparent antennas, a distance less than 1/20 of the dielectric wavelength, or a distance less than 1/25 of the dielectric wavelength could be used as the spacing D121 and the spacing D131.

Generally speaking, the relationship between the dielectric wavelength and the frequency is described as the following equation (1). Considering the gain characteristics of the planar transparent antenna structure 100, the spacing D121 and the spacing D131 could be adjusted according to the following equation (1).

$$\lambda = \frac{c}{f} = \frac{c_0}{f\sqrt{\varepsilon_r}} = \frac{\lambda_0}{\sqrt{\varepsilon_r}} \quad (1)$$

$\lambda$ is the wavelength of the electromagnetic wave in the dielectric substrate 110, f is the frequency of the electromagnetic wave, c is the propagation speed of the electromagnetic wave in the dielectric substrate 110, $\varepsilon_r$ is the relative dielectric constant, $c_0$ is the propagation speed of the electromagnetic wave in vacuum, and $\lambda_0$ is the wavelength of electromagnetic waves in vacuum.

On the other hand, in application scenarios that require light transmittance, a distance less than 1/10 of the dielectric wavelength, a distance less than 1/15 of the dielectric wavelength, or a distance less than 1/20 of the dielectric wavelength could be used as the spacing D121 and the spacing D131.

The light transmittance could be calculated according to the following equation (2):

$$R = \frac{\left\{A + (A - S)\left[\frac{L}{(L + W)}\right]^2\right\}}{S} \quad (2)$$

R is the light transmittance, S is the range size of the radiation conductive layer 120 (or the ground conductive layer 130), A is the total opening area among the wires 121 (or the wires 131), W is the width W1211 (or the width W1311), L is the spacing D1211 (or the spacing D1311).

Figure 7:
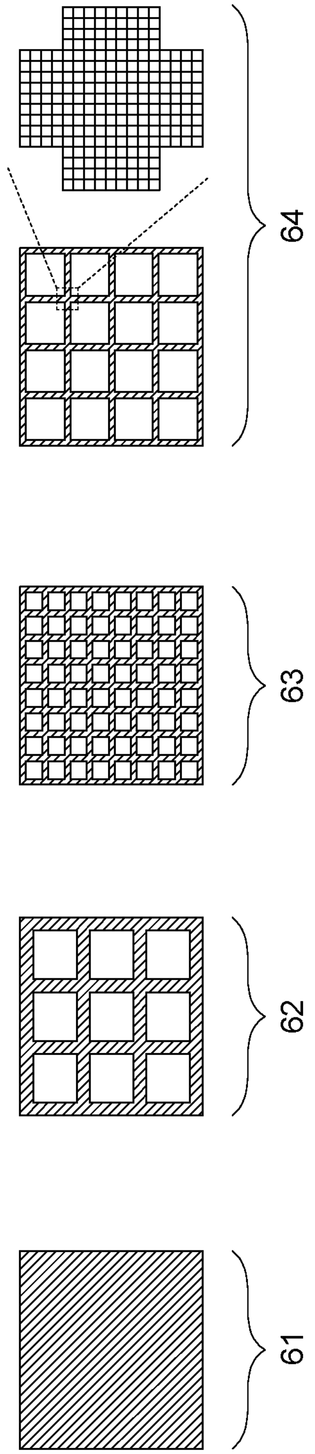
FIG. 7 illustrates examples of radiation conductive layers under different designs.

Please refer to Table 1 as below and FIG. 7. Table 1 illustrates the light transmittance of the radiation conductive layer under different designs. FIG. 7 illustrates examples of radiation conductive layers 61, 62, 63, 64 under different designs.

TABLE 1

| | Without the mesh | With the thicker mesh | With the tinner mesh | With the thicker mesh and the thinner mesh (two-levels mesh) |
|---|---|---|---|---|
| Light transmittance | 0% | 40.5% | 90% | 94% |
| Structure | The radiation conductive layer 61 in the FIG. 7 | The radiation conductive layer 62 in the FIG. 7 | The radiation conductive layer 63 in the FIG. 7 | The radiation conductive layer 64 in the FIG. 7 |

As shown in Table 1, the two-levels mesh could increase the light transmittance to 94%, such that the planar transparent antenna structure 100 is almost transparent. In this way, the planar transparent antenna structure 100 not only has high light transmittance, but also has good radiation efficiency, and could be applied to vehicles, buildings, and displays.

Figure 8:
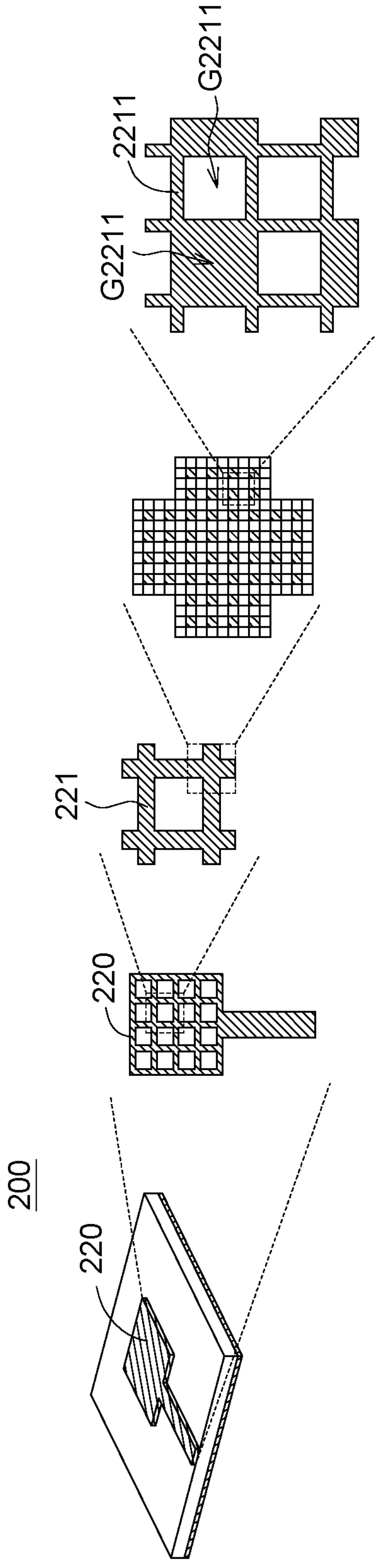
FIG. 8 illustrates a radiation conductive layer of a planar transparent antenna structure according to another embodiment.
Figure 9:
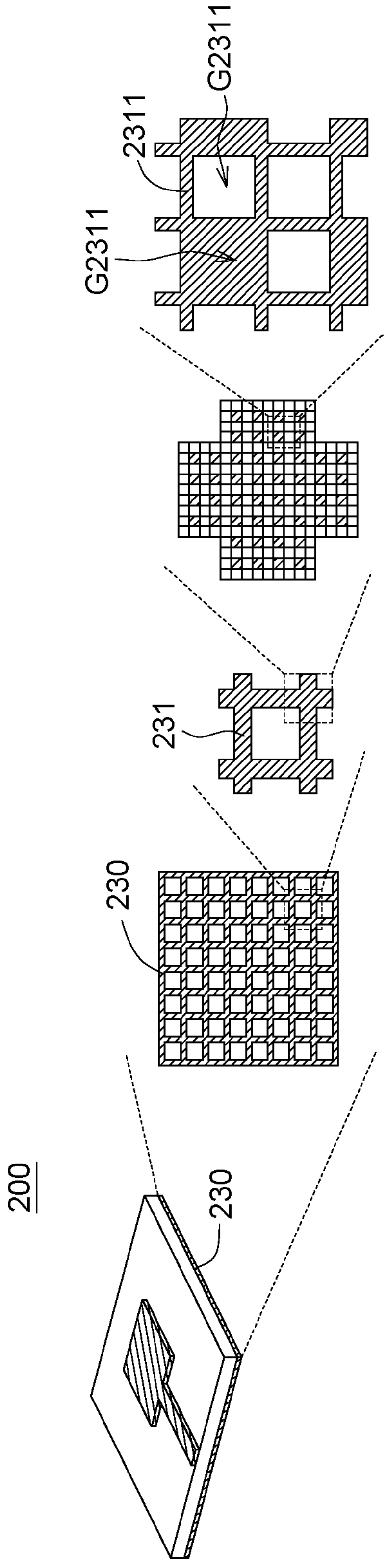
FIG. 9 illustrates a ground conductive layer of the planar transparent antenna structure according to another embodiment.

Please refer to FIGS. 8 and 9. FIG. 8 illustrates a radiation conductive layer 220 of a planar transparent antenna structure 200 according to another embodiment. FIG. 9 illustrates a ground conductive layer 230 of the planar transparent antenna structure 200 according to another embodiment. As shown in the FIG. 8, the radiation conductive layer 220 is composed of a plurality of wires 221 interleaved and connected with each other. Each of the wires 221 is composed of a plurality of grid lines 2211 interleaved and connected with each other. In the embodiment of the FIG. 8, some of partitions G2211 between the grid lines 2211 are filled.

As shown in FIG. 9, the ground conductive layer 230 is composed of a plurality of wires 231 interleaved and connected with each other. Each of the wires 231 is composed of a plurality of grid lines 2311 interleaved and connected with each other. In the embodiment of the FIG. 9, some of partitions G2311 between the grid lines 2311 are filled.

In the embodiments of the FIGS. 8 and 9, although some of the partitions G2211 and G2311 are filled, the two-levels mesh structure could still improve the light transmittance, such that the planar transparent antenna structure 200 is almost transparent. In this way now, the planar transparent antenna structure 200 not only has high light transmittance, but also has good radiation efficiency, and could be used in vehicles, buildings, and displays.

Figure 10:
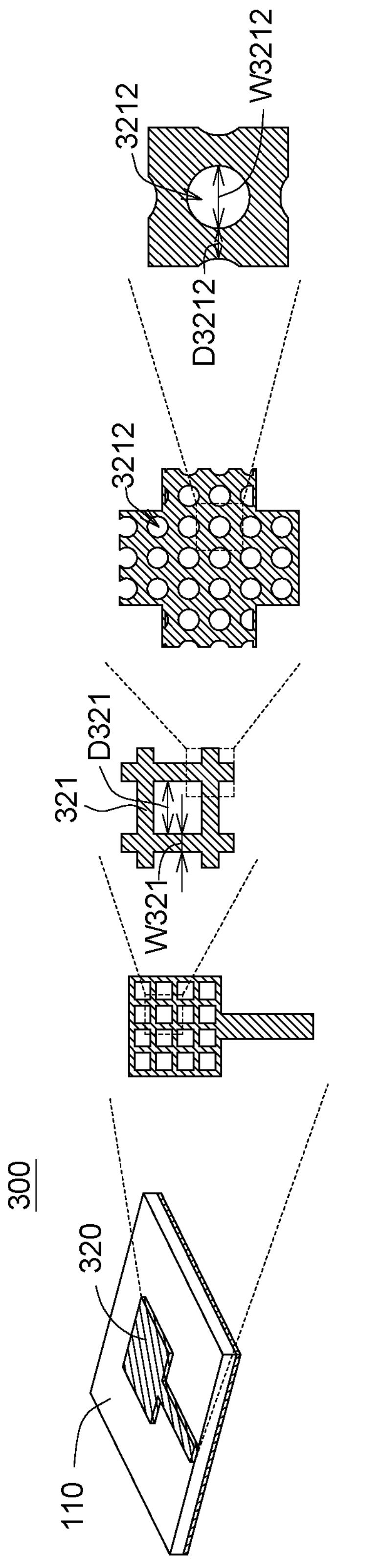
FIG. 10 illustrates a radiation conductive layer of a planar transparent antenna structure according to another embodiment.
Figure 11:
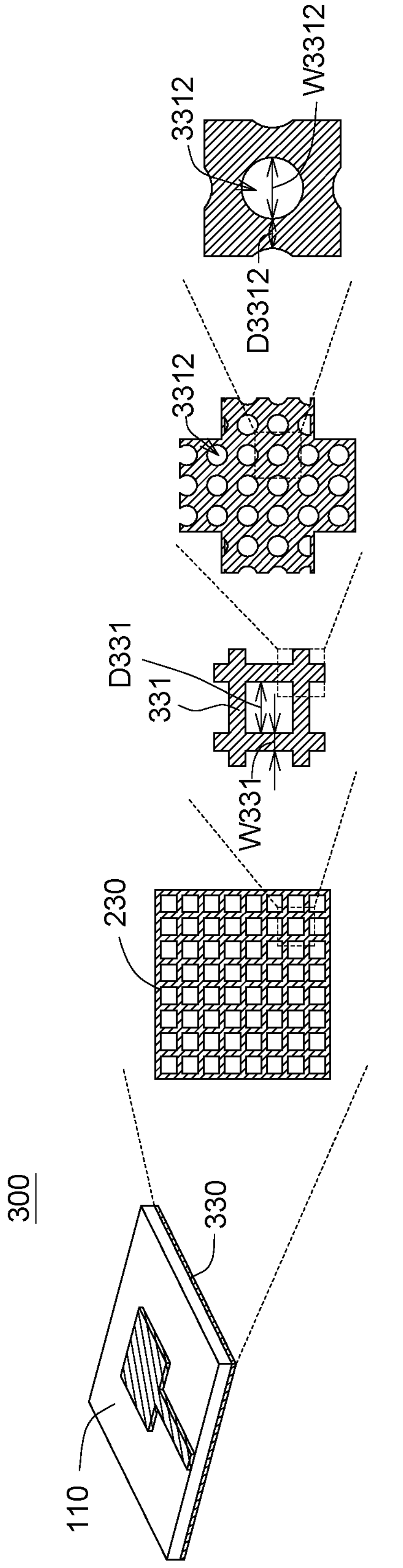
FIG. 11 illustrates a ground conductive layer of the planar transparent antenna structure according to another embodiment.

Please refer to FIGS. 10 and 11. FIG. 10 illustrates a radiation conductive layer 320 of a planar transparent antenna structure 300 according to another embodiment. FIG. 11 illustrates a ground conductive layer 330 of the planar transparent antenna structure 300 according to another embodiment. As shown in the FIG. 10, the radiation conductive layer 320 is composed of a plurality of wires 321 interlaced and connected with each other. Each of the wire 321 has a plurality of holes 3212. Each of the holes 3212 is, for example, a circular structure.

In one embodiment, the widths W321 of the wires 321 could be substantially identical. The width W321 of each of the wires 321 is, for example, smaller than the spacing D321 among the wires 321 to increase the light transmittance.

In one embodiment, the spacing D321 among the wires 321 is less than 1/10, 1/15, 1/20, 1/25 of the dielectric wavelength of the dielectric substrate 110. In one embodiment, the spacings D321 among the wires 321 could be substantially identical.

The width W3212 of each of the holes 3212 is 100 to 300 um, such as 100 um, 150 um, 200 um, 250 um or 300 μm. In one embodiment, the width W3212 of each of the holes 3212 could be substantially identical.

The spacing D3212 among the holes 3212 is 5 to 100 um, such as 5 um, 20 um, 40 um, 60 μm, 80 um, or 100 μm. In one embodiment, the spacing D3212 among the holes 3212 could be substantially identical. The spacing D3212 among the holes 3212 is, for example, smaller than the width W3212 of each of the holes 3212, to increase the light transmittance.

In addition, the width W321 of each of the wires 321 is larger than the width W3212 of each of the holes 3212, so that each of the wires 321 could contain at least one hole 3212.

As shown in the FIG. 11, the ground conductive layer 330 is composed of a plurality of wires 331 interlaced and connected with each other. Each of the wires 331 has a plurality of holes 3312. Each of the hole 3312 is, for example, a circular structure.

In one embodiment, the widths W331 of the wires 331 could be substantially identical. The width W331 of each of the wires 331 is, for example, smaller than the spacing D331 among the wires 331 to increase the light transmittance.

In one embodiment, the spacing D331 among the wires 331 is less than 1/10, 1/15, 1/20, 1/25 of the dielectric wavelength of the dielectric substrate 110. In one embodiment, the spacings D331 among the wires 331 could be substantially identical.

The width W3312 of each of the holes 3312 is 100 to 300 um, such as 100 um, 150 um, 200 um, 250 um or 300 μm. In one embodiment, the widths W3312 of the holes 3312 could be substantially identical.

The spacing D3312 among the holes 3312 is 5 to 100 um, such as 5 um, 20 um, 40 um, 60 μm, 80 um, or 100 μm. In one embodiment, the spacing D3212 among the holes 3312 could be substantially identical. The spacing D3312 among the holes 3312 is, for example, smaller than the width W3312 of each of the holes 3312, to increase the light transmittance.

In addition, the width W331 of each of the wires 331 is larger than the width W3312 of each of the holes 3312, so that each of the wires 331 could contain at least one hole 3312.

In the embodiments of FIGS. 10 and 11, the holes 3212 and 3312 could also increase the light transmittance of the wires 321 and 332, such that the planar transparent antenna structure 300 is almost transparent. In this way, the planar transparent antenna structure 300 looks almost transparent. The planar transparent antenna structure 300 not only has high light transmittance, but also has good radiation efficiency, and could be used in vehicles, buildings, and displays.

Figure 12:
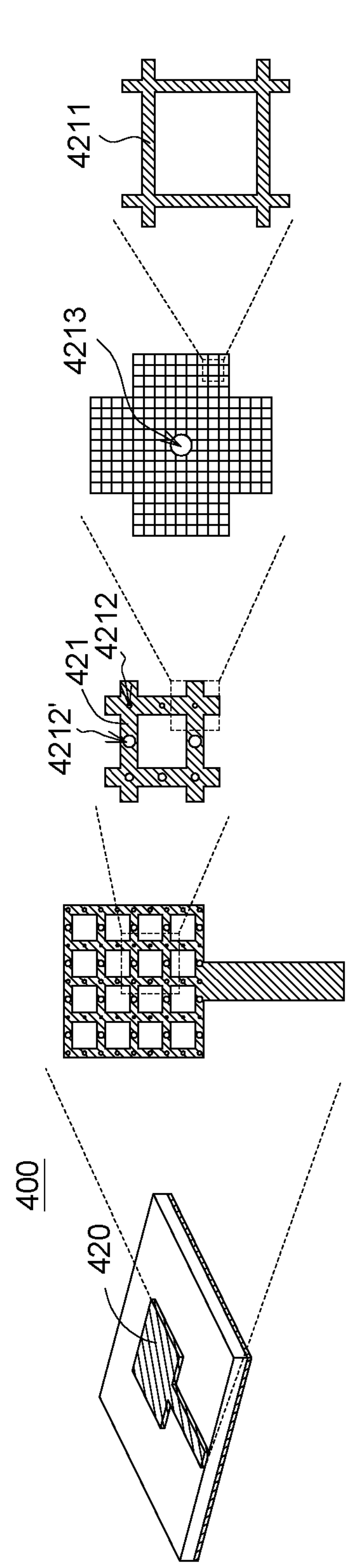
FIG. 12 illustrates a radiation conductive layer of a planar transparent antenna structure according to another embodiment.
Figure 13:
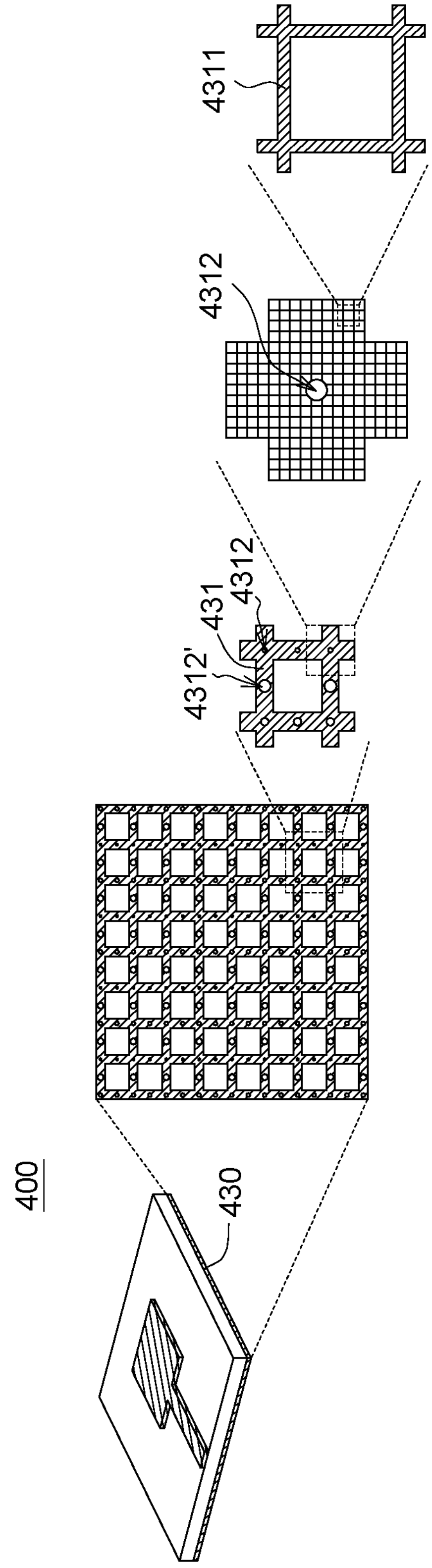
FIG. 13 illustrates a ground conductive layer of the planar transparent antenna structure according to another embodiment.

Please refer to FIGS. 12 and 13. FIG. 12 illustrates a radiation conductive layer 420 of a planar transparent antenna structure 400 according to another embodiment. FIG. 13 illustrates a ground conductive layer 430 of the planar transparent antenna structure 400 according to another embodiment. As shown in FIG. 12, the radiation conductive layer 420 is composed of a plurality of wires 421 interleaved and connected with each other. Each of the wires 421 is composed of a plurality of grid lines 4211 interleaved and connected with each other. In the embodiment of FIG. 12, each of the wires 421 further includes a plurality of through holes 4212, 4212'. The sizes of the through holes 4212, 4212' are not exactly identical.

As shown in FIG. 13, the ground conductive layer 430 is composed of a plurality of wires 431 interleaved and connected with each other. Each of the wires 431 is composed of a plurality of grid lines 4311 interleaved and connected with each other. In the embodiment of FIG. 13, each of the wires 431 includes a plurality of through holes 4312, 4312'. The sizes of the through holes 4312, 4312' are not exactly identical.

In the embodiments of FIGS. 12 and 13, the through holes 4212, 4212', 4312, 4312' could further improve the light transmittance of the wires 421, 432, such that the planar transparent antenna structure 400 is more transparent. In this way, the planar transparent antenna structure 400 not only has high light transmittance, but also has good radiation efficiency, and could be used in vehicles, buildings, and displays.

Figure 14:
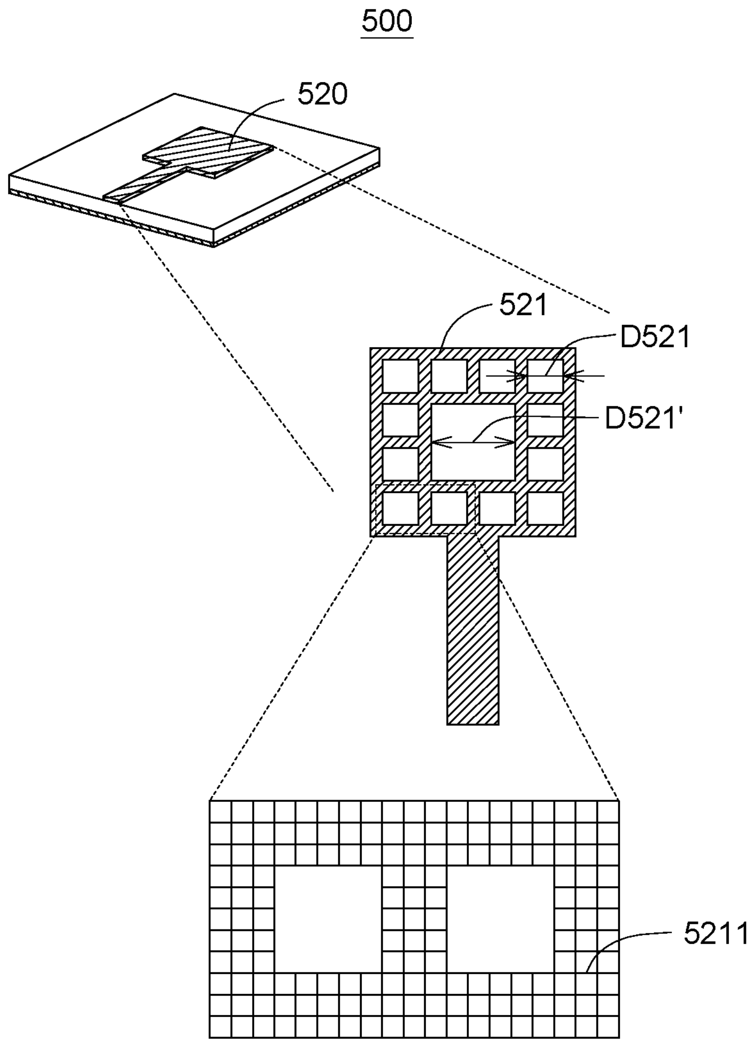
FIG. 14 illustrates a radiation conductive layer of a planar transparent antenna structure according to another embodiment.

Please refer to FIG. 14, which illustrates a radiation conductive layer 520 of a planar transparent antenna structure 500 according to another embodiment. The radiation conductive layer 520 is composed of a plurality of wires 521 interleaved and connected with each other. Each of the wires 521 is composed of a plurality of wires 5211 interleaved and connected with each other. In the embodiment of FIG. 14, the spacings D521 and D521' among the wires 521 are not exactly identical. The larger spacing D521' could form a larger opening.

The ground conductive layer (not shown) of the planar transparent antenna structure 500 could also adopt a design similar to the radiation conductive layer 520, which will not be described again. In the embodiment of FIG. 14, the larger spacing D521' could further improve the light transmittance of wire 521, so that the planar transparent antenna structure 500 look more transparent. In this way, the planar transparent antenna structure 500 not only has high light transmittance, but also has good radiation efficiency, and could be used in vehicles, buildings. And displays.

Figure 15:
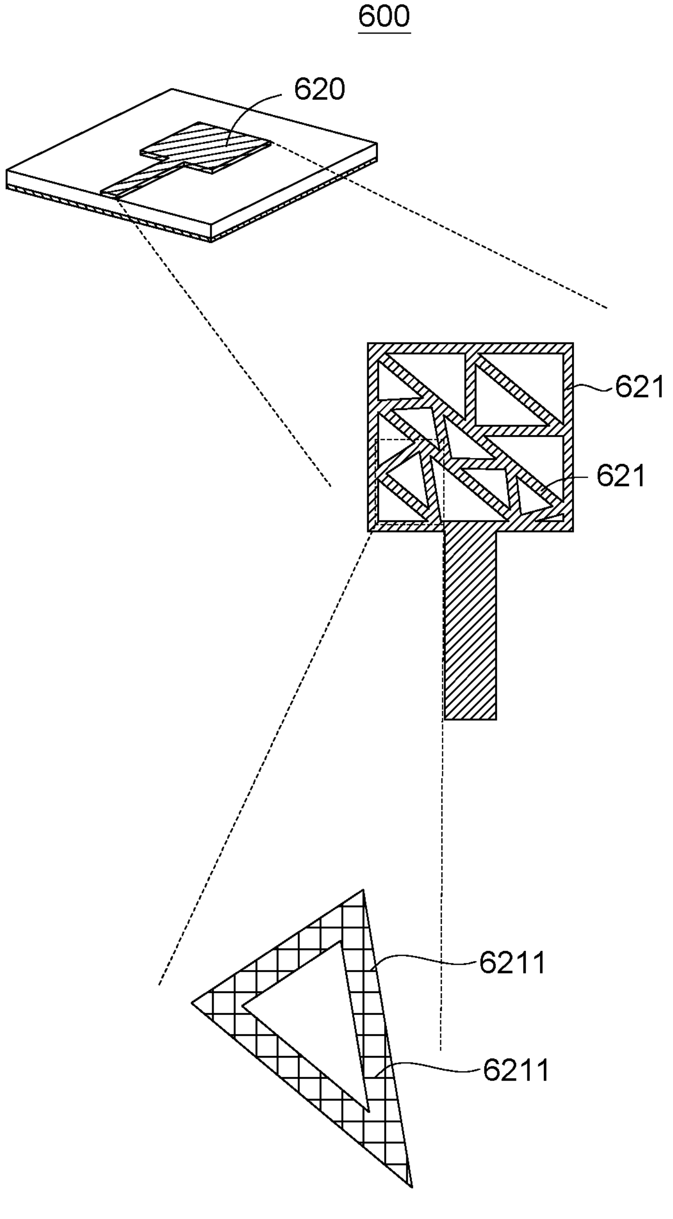
FIG. 15 illustrates a radiation conductive layer of a planar transparent antenna structure according to another embodiment.

Please refer to FIG. 15, which illustrates a radiation conductive layer 620 of a planar transparent antenna structure 600 according to another embodiment. As shown in FIG. 15, the radiation conductive layer 620 is composed of a plurality of interleaved wires 621. Each of the wires 621 is composed of a plurality of grid lines 6211 interleaved and connected with each other. In the embodiment of FIG. 15, the wires 621 are interlaced and connected to form a plurality of triangles. The triangles could provide a more stable structure and prevent the radiation conductive layer 620 from deforming.

The ground conductive layer (not shown) of the planar transparent antenna structure 600 could also adopt the design similar to the radiation conductive layer 620, which will not be described again. In the embodiment of FIG. 15, the triangular structure could provide a more stable structure. In this way, the planar transparent antenna structure 600 not only has high light transmittance, but also has good stability and radiation efficiency, and could be used in vehicles, buildings, and displays.

Figure 16:
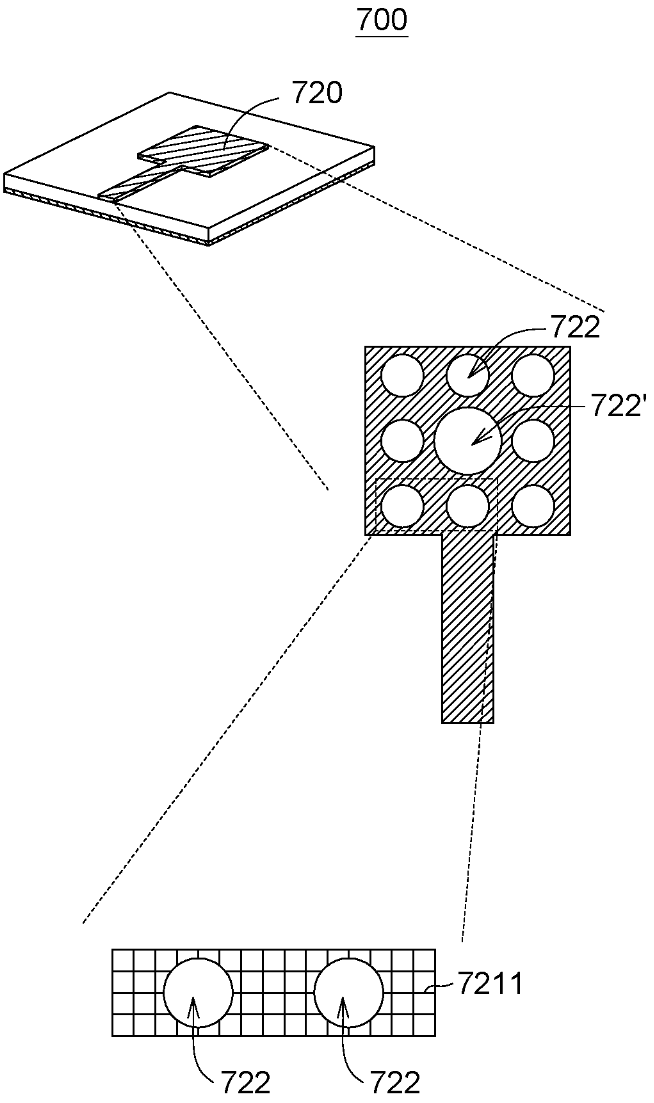
FIG. 16 illustrates a radiation conductive layer of a planar transparent antenna structure according to another embodiment.

Please refer to FIG. 16, which illustrates a radiation conductive layer 720 of a planar transparent antenna structure 700 according to another embodiment. As shown in FIG. 16, the radiation conductive layer 720 has a plurality of openings 722, 722' and a plurality of grid lines 7211. The grid lines 7211 are distributed between the openings 722, 722'. The sizes of openings 722, 722' are not exactly identical.

In the embodiment of FIG. 16, the opening 722 could also increase the light transmittance of the radiation conductive layer 720, so that the planar transparent antenna structure 700 is almost transparent. In this way, the planar transparent antenna structure 700 not only has high light transmittance, but also has good radiation efficiency and could be used in vehicles, buildings, and displays.

Figure 17:
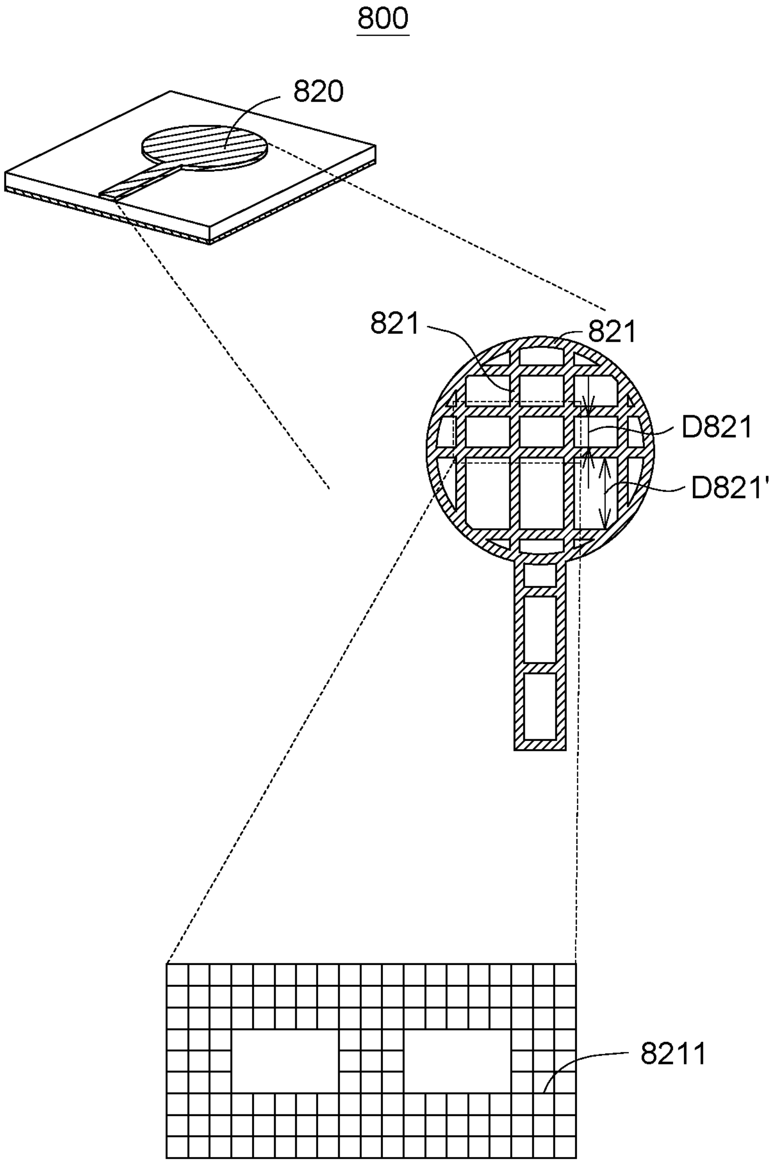
FIG. 17 illustrates a radiation conductive layer of a planar transparent antenna structure according to another embodiment.

Please refer to FIG. 17, which illustrates a radiation conductive layer 820 of a planar transparent antenna structure 800 according to another embodiment. The radiation conductive layer 820 is composed of a plurality of wires 821 interleaved and connected with each other. Each of the wires 821 is composed of a plurality of wires 821 interleaved and connected with each other. Each of the wires 821 is composed of a plurality of grid lines 8211 interleaved and connected with each other. In the embodiment of FIG. 17, the edge of the radiation conductive layer 820 is a circular structure.

The spacings D821 and D821' among the wires 821 are not exactly identical. The larger spacing D821' will form a larger opening.

The ground conductive layer (not shown) of the planar transparent antenna structure 800 could also adopt the design similar to the radiation conductive layer 820, which will not be described again. In the embodiment of FIG. 17, even if the radiation conductive layer 820 (or the ground conductive layer) is not a rectangular structure, a two-levels mesh structure design could also be used. The design of the two-levels mesh structure makes the planar transparent antenna structure 800 look almost transparent. In this way, the planar transparent antenna structure 800 not only has high light transmittance, but also has good radiation efficiency, so it could be used in vehicles, buildings, and displays.

It will be apparent to those skilled in the art that various modifications and variations can be made to the disclosed embodiments. It is intended that the specification and examples be considered as exemplars only, with a true scope of the disclosure being indicated by the following claims and their equivalents.

What is claimed is:

1. A planar transparent antenna structure, comprising:
- a dielectric substrate, having a first surface and a second surface;
- a radiation conductive layer, disposed on the first surface of the dielectric substrate; and
- a ground conductive layer, disposed on the second surface of the dielectric substrate;
- wherein the radiation conductive layer and the ground conductive layer are composed of a plurality of wires interlaced and connected with each other, and each of the wires interlaced and connected with each other is composed of a plurality of grid lines interlaced and connected with each other to form a two-levels metal mesh.

2. The planar transparent antenna structure according to claim 1, wherein a spacing among the wires is less than 1/20 of a dielectric wavelength of the dielectric substrate.

3. The planar transparent antenna structure according to claim 1, wherein a width of each of the wires is greater than a sum of a width of each of the grid lines and a spacing among the grid lines.

4. The planar transparent antenna structure according to claim 1, wherein a width of each of the grid lines is 5 to 100 um.

5. The planar transparent antenna structure according to claim 1, wherein a spacing among of the grid lines is 100 to 300 um.

6. The planar transparent antenna structure according to claim 1, wherein the wires are substantially parallel or perpendicular to each other.

7. The planar transparent antenna structure according to claim 1, wherein the grid lines are substantially parallel or perpendicular to each other.

8. The planar transparent antenna structure according to claim 1, wherein each of the wires includes a plurality of through holes.

9. The planar transparent antenna structure according to claim 8, wherein sizes of the through holes are not identical.

10. The planar transparent antenna structure according to claim 1, wherein the wires are interlaced and connected to form a plurality of triangles.

11. The planar transparent antenna structure according to claim 1, wherein an edge of the radiation conductive layer is a circular structure.

12. The planar transparent antenna structure according to claim 1, wherein spacings among the wires are not identical.

13. A planar transparent antenna structure, comprising:
- a dielectric substrate, having a first surface and a second surface;
- a radiation conductive layer, disposed on the first surface of the dielectric substrate; and
- a ground conductive layer, disposed on the second surface of the dielectric substrate;
- wherein the radiation conductive layer and the ground conductive layer are composed of a plurality of wires interlaced and connected with each other, each of the wires interlaced and connected with each other has a plurality of holes, and the wires having the holes are interlaced and connected with each other.

14. The planar transparent antenna structure according to claim 13, wherein a spacing among the wires is less than 1/20 of a dielectric wavelength of the dielectric substrate.

15. The planar transparent antenna structure according to claim 13, wherein a width of each of the holes is 100 to 300 um.

16. The planar transparent antenna structure according to claim 13, wherein a spacing among the holes is 5 to 100 um.

17. The planar transparent antenna structure according to claim 13, wherein a width of each of the wires is larger than a width of each of the holes.

18. The planar transparent antenna structure according to claim 13, wherein each of the holes is circle.

19. A planar transparent antenna structure, comprising:
- a dielectric substrate, having a first surface and a second surface;
- a radiation conductive layer, disposed on the first surface of the dielectric substrate; and
- a ground conductive layer, disposed on the second surface of the dielectric substrate;
- wherein the radiation conductive layer and the ground conductive layer have a plurality of openings arranged in an array and a plurality of grid lines, and the grid lines are distributed between the openings arranged in the array.

20. The planar transparent antenna structure according to claim 19, wherein a width of each of the openings is less than 1/20 of a dielectric wavelength of the dielectric substrate.

* * * * *